(12) United States Patent
Ianni et al.

(10) Patent No.: US 6,359,105 B1
(45) Date of Patent: Mar. 19, 2002

(54) CROSS-LINKED POLYESTER TONERS AND PROCESS OF MAKING SUCH TONERS

(75) Inventors: John James Ianni, Medina; J. Stephen Kittelberger, Rochester; Daniel Andrew Harrington, Walworth; Eugene Frederick Young, Rochester; Hui Chang, Pittsford; Nilmarie Santos-Roman, Penfield; Dennis J. O'Keefe, Ontario; Joseph Louis Leonardo, Penfield; Paul Lynn Jacobs, Webster; Kiran B. Sheth, Penfield; Dongming Li; Louis Joseph Kurtic, Jr., both of Fairport; Robert Edward Lutz, Webster; Yelena Lipovetskaya, Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/695,861

(22) Filed: Oct. 26, 2000

(51) Int. Cl.⁷ .............................................. C08G 63/02
(52) U.S. Cl. ....................... 528/272; 528/271
(58) Field of Search ................... 528/271, 272

(56) References Cited

U.S. PATENT DOCUMENTS

| | | |
|---|---|---|
| 3,847,604 A | 11/1974 | Hagenbach et al. |
| 3,876,736 A | 4/1975 | Takiura |
| 4,089,917 A | 5/1978 | Takiura et al. |
| 4,298,672 A | 11/1981 | Lu |
| 4,338,390 A | 7/1982 | Lu |
| 4,894,308 A | 1/1990 | Mahabadi et al. |
| 4,935,326 A | 6/1990 | Creatura et al. |
| 4,937,166 A | 6/1990 | Creatura et al. |
| 4,973,439 A | 11/1990 | Chang et al. |
| 4,990,293 A | 2/1991 | Macosko et al. |
| 5,227,460 A | 7/1993 | Mahabadi et al. |
| 5,352,556 A | 10/1994 | Mahabadi et al. |
| 5,376,494 A | 12/1994 | Mahabadi et al. |
| 5,395,723 A | 3/1995 | Mahabadi et al. |
| 5,401,602 A | 3/1995 | Mahabadi et al. |
| 6,063,827 A | 5/2000 | Sacripante et al. |

*Primary Examiner*—Terressa M. Boykin
(74) *Attorney, Agent, or Firm*—Oliff & Berridge, PLC; Eugene O. Palazzo

(57) ABSTRACT

Cross-linked toner resin having linear portions and cross-linked portions of high density microgel particles, where the toner resin is an unsaturated polyester resin, is prepared using a liquid chemical initiator such as 1,1-bis(t-butyl peroxy)-3,3,5-trimethylcyclohexane so that the cross-linked resin achieved contains less than 0.20 percent by weight of acids. In particular, the cross-linked toner resin is free of benzoic acid. The method of making the cross-linked toner resin includes (a) spraying the liquid chemical initiator onto the unsaturated polyester resin prior to, during or subsequent to melting of the unsaturated polyester resin to form a polymer melt; and (b) subsequently cross-linking the polymer melt under high shear to form the cross-linked toner resin.

25 Claims, 13 Drawing Sheets

CROSS-LINKED POLYESTER TONERS AND PROCESS OF MAKING SUCH TONERS

BACKGROUND OF THE INVENTION

1. Field of the Invention

The present invention is generally directed to cross-linked toner resins exhibiting improved xerographic properties, a process for making such cross-linked toner resins, and toners derived therefrom. More specifically, the present invention relates to cross-linked polyester resins such as propoxylated bisphenol A fumarate resins that are cross-linked in a reactive extrusion process in the presence of the liquid 1,1-bis(t-butyl peroxy)-3,3,5-trimethylcyclohexane as a chemical initiator.

2. Discussion of Related Art

Many processes are known for effecting polymerization reactions, including reactive extrusion processes, for both initial polymerization reactions employing monomers or prepolymers, and for polymer modification reactions, such as graft, coupling, cross-linking and degradation reactions.

U.S. Pat. No. 4,894,308 and U.S. Pat. No. 4,973,439, for example, disclose extrusion processes for preparing electrophotographic toner compositions in which pigment and charge control additive were dispersed into the binder resin in the extruder. However, in each of these patents, there is no suggestion of a chemical reaction occurring during extrusion, i.e., they do not relate to reactive extrusion processes for forming the toner resin.

An injection molding process for producing cross-linked synthetic resin molded articles is disclosed in U.S. Pat. No. 3,876,736 in which polyolefin or polyvinyl chloride resin and cross-linked agent were mixed in an extruder, and then introduced into an externally heated reaction chamber outside the extruder wherein the cross-linking reaction occurred at increased temperature and pressure, and at low or zero shear. In U.S. Pat. No. 4,089,917, an injection molding and cross-linking process is disclosed in which polyethylene resin and cross-linking agent were mixed in an extruder and reacted in reaction chambers at elevated temperature and pressure. Heating of the resin mixture occurred partially by high shear in inlet flow orifices. However, the cross-linking reaction in this process still took place in the reaction chambers at low or zero shear, and the final product is a thermoset molded part, and thus is not useful for toner resins.

A process for dispensing premixed reactive precursor polymer mixtures through a die for the purposes of reaction injection molding or coating is described in U.S. Pat. No. 4,990,293 in which polyurethane precursor systems were cross-linked in the die and not in the extruder. The dimensions of the die channel were determined such that the value of the wall shear stress is greater than a critical value in order to prevent gel buildup and consequent plugging of the die. The final product is a thermoset molded part, and thus is not useful for toner resins.

It should be noted that the processes disclosed in U.S. Pat. Nos. 3,876,736, 4,089,917 and 4,990,293 are not reactive extrusion processes, because the cross-linking in each case occurs in a die or a mold, and not in an extruder, and the cross-linking takes place at low or zero shear. These processes are for producing engineering plastics such as thermoset materials which cannot be remelted once molded, and thus are not suitable for toner application.

U.S. Pat. Nos. 5,227,460, 5,352,556, 5,376,494, 5,395,723 and 5,401,602, each incorporated herein by reference in their entireties, describe a low melt toner resin with low minimum fix temperature and wide fusing latitude that contains a linear portion and a cross-linked portion containing high density cross-linked microgel particles, but substantially no low density cross-linked polymer. It is described that the resin may be formed by reactive melt mixing under high shear and high temperature of an unsaturated polyester resin such as a poly(propoxylated bisphenol A fumarate) in the presence of a chemical initiator that has been mixed into the polyester. These patents describe that the chemical initiator may be selected from a large list of possible initiators, with benzoyl peroxide being preferred. The initiator 1,1-bis(t-butyl peroxy)-3,3,5-trimethylcyclohexane is mentioned in passing as being within the large group of possible initiators. The patents also describe that the initiator, whether solid or liquid, is mixed with the polyester resin, for example in a rotary tumble blender or a batch mixer, although U.S. Pat. No. 5,395,723 indicates that the mixing also may take place within the extruder.

U.S. Pat. No. 6,063,827, incorporated herein by reference in its entirety, describes a process for the preparation of an unsaturated polyester which comprises (i) reacting an organic diol with a cyclic alkylene carbonate in the presence of a first catalyst to thereby form a polyalkoxy diol, (ii) optionally adding thereto a further amount of cyclic alkylene carbonate in the presence of a second catalyst, and (iii) subsequently polycondensing the resulting mixture with a dicarboxylic acid. The unsaturated polyester formed may then be further subjected to cross-linking with an initiator as in the patents described immediately above in order to form a toner resin.

To date, benzoyl peroxide has been used as the preferred chemical initiator in the reactive extrusion methods of cross-linking unsaturated polyester resins. Although the cross-linked resins obtained by such processes exhibit, at least initially, satisfactory xerographic performance properties, several problems exist with respect to the use of benzoyl peroxide as an initiator.

First, when used as an initiator in the cross-linking of the unsaturated polyester resin, benzoic acid is produced as a by-product. Removal of benzoic acid from the formed cross-linked polyester is problematic in that although it can be partially removed as a volatile through a vacuum stripping procedure, the benzoic acid quickly condenses within the vacuum system and rapidly clogs the system, thereby causing frequent shutdowns for cleaning. As a result, residual benzoic acid, for example on the order of 0.25% by weight of the resin, typically remains in the product resin.

Second, benzoyl peroxide is a solid initiator that must be mixed with the unsaturated polyester, which is in granular form, as discussed above. As this physical blend is fed into the reactive extruder, flow-induced granule separation can and does occur. This produces a variability of the initiator concentration with time into the extruder, and thus a high variability of gel content with time in the cross-linked product.

Third, benzoyl peroxide is a hazardous chemical. The hydrated form of benzoyl peroxide dries out quickly and becomes a shock hazard after several hours.

Fourth, toners prepared based upon cross-linked resins in which benzoyl peroxide is used as the initiator are very sensitive to environmental conditions, and the xerographic performance of such toners decrease with increasing temperature and humidity conditions. The deteriorating performance properties include charging, humidity sensitivity of charging, and background density.

What is still desired is an improved cross-linked toner resin from unsaturated polyester resin and a process for making the same in which the foregoing shortcomings associated with the use of benzoyl peroxide as an initiator in forming the cross-linked toner resins are overcome.

SUMMARY OF THE INVENTION

It is an object of the present invention to develop a toner resin that possesses improved xerographic performance, particularly in terms of charging, humidity sensitivity and background density properties, compared to prior toner resins.

It is still a further object of the present invention to replace benzoyl peroxide as an initiator in the cross-linking of unsaturated polyester resin.

It is a still further object of the present invention to develop an improved process of cross-linking the unsaturated polyester resin so as to derive a cross-linked product of more uniform structure and properties.

These and other objects of the present invention are achieved herein.

The present invention thus relates to a cross-linked toner resin consisting essentially of linear portions and cross-linked portions, wherein the toner resin is an unsaturated polyester resin, wherein the cross-linked portions consist essentially of high density cross-linked microgel particles, and wherein the cross-linked toner resin contains less than 0.20 percent by weight of acids. In particular, the cross-linked toner resin is free of benzoic acid.

The present invention also relates to a method of making the cross-linked toner resin by (a) spraying a liquid chemical initiator onto the unsaturated polyester resin while blending and prior to, during or subsequent to melting of the unsaturated polyester resin to form a polymer melt; and (b) subsequently cross-linking the polymer melt under high shear to form the cross-linked toner resin.

Use of a liquid chemical initiator, mainly 1,1-bis(t-butyl peroxy)-3,3,5-trimethylcyclohexane, permits the initiator to be sprayed onto the unsaturated polyester resin, thereby permitting more uniform distribution of the initiator throughout the resin and thus more uniform cross-linking of the resin. Further, 1,1-bis(t-butyl peroxy)-3,3,5-trimethylcyclohexane enables a cross-linked resin to be obtained that exhibits better performance than cross-linked resins formed using benzoyl peroxide while avoiding the problems associated with the use of benzoyl peroxide, including avoiding the presence of residual by-product benzoic acid in the cross-linked resin.

DETAILED DESCRIPTION OF PREFERRED EMBODIMENTS

Figure 1:
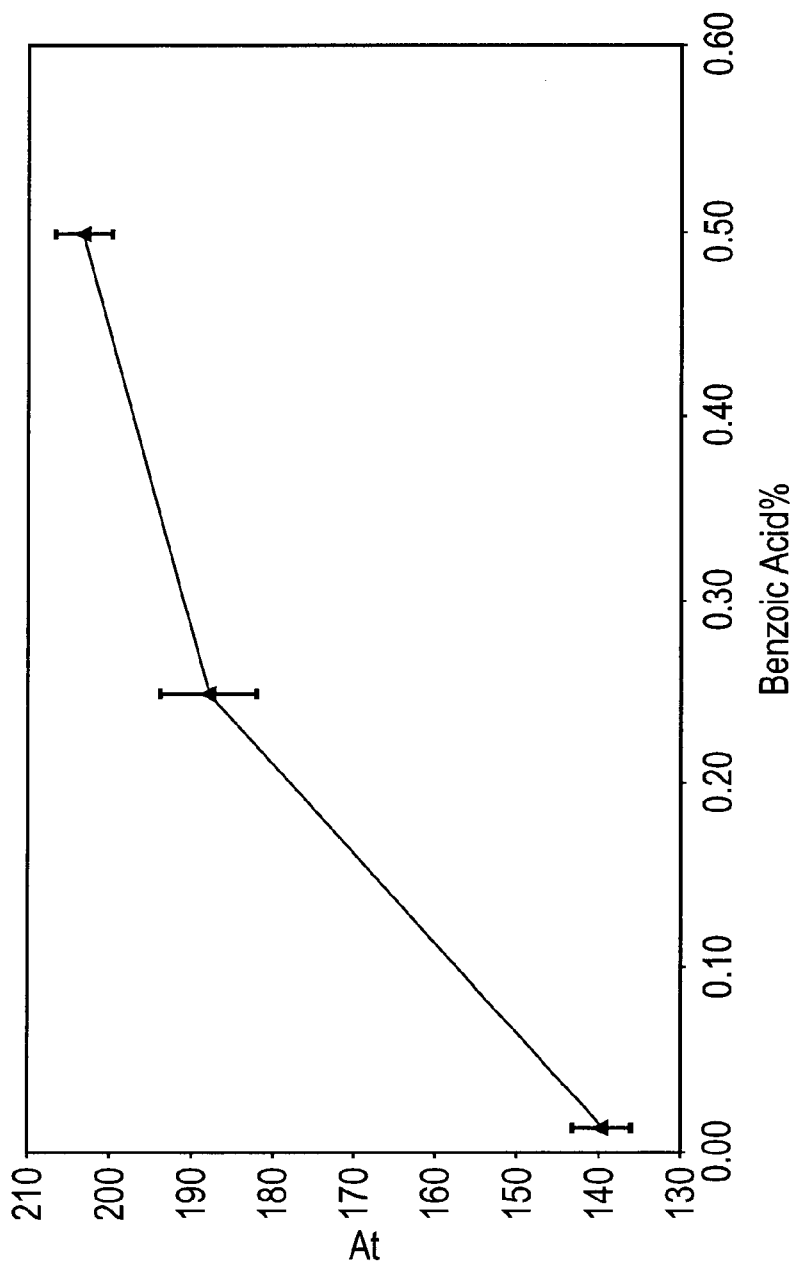
FIG. 1 graphically depicts that A(t) performance of a toner undesirably increases with increasing benzoic acid content.

The present invention provides low fix temperature toner resins and a process for fabricating such low fix temperature toner resins by reactive melt mixing in any melt mixing device, batch or continuous, but preferably continuous such as, for example, an extruder, wherein polymer base resins, in particular unsaturated polyester resins, are cross-linked at high temperature and under high shear conditions using a liquid chemical initiator as the cross-linking agent.

The cross-linked toner resins of the present invention contain a highly cross-linked portion in the form of microgels distributed throughout a linear portion of the resin, and in which the size of the gel particles does not grow with increasing degree of cross-linking. The cross-linked toner resins are prepared so as to be substantially free of acid substituents, and also preferably to be substantially free of all by-products of the chemical initiator generated during the cross-linking process step.

The present invention provides a low fix temperature toner resin, and specifically a low fix temperature toner resin based on cross-linked resin comprised of cross-linked and linear portions, the cross-linked portion consisting essentially of microgel particles with an average volume particle diameter (as determined by scanning electron microscopy and transmission electron microscopy) up to about 1.0 micron, preferably about 0.005 to about 0.5 microns, more preferably about 0.01 to about 0.1 microns, the microgel particles being substantially uniformly distributed throughout the linear portions of the resin. This resin may be prepared by a reactive melt mixing process, as explained more fully below.

When produced by a reactive melt mixing process wherein the cross-linking occurs at high temperature and under high shear, the size of the microgel particles does not grow with increasing degree of cross-linking. Also, the microgel particles are distributed substantially uniformly throughout the linear portion.

The cross-linked portions or microgel particles are prepared in such a way that there is substantially no distance between the polymer chains. Thus the cross-linking is preferably not accomplished via monomer or polymer bridges. The polymer chains are directly connected, for example at unsaturation sites or other reactive sites, or in some cases by a single intervening atom such as, for example, oxygen. Therefore, the cross-linked portions are very dense and do not swell as much as gel produced by conventional cross-linking methods. This cross-link structure is different from conventional cross-linking in which the cross-link distance between chains is quite large with several monomer units, and where the gels swell very well in a solvent such as tetrahydrofuran or toluene. These highly cross-linked dense microgel particles distributed throughout the linear portion impart elasticity to the resin which improves the resin offset properties, while not substantially affecting the resin minimum fix temperature.

The present invention provides a new type of toner resin which is preferably a partially cross-linked unsaturated resin such as unsaturated polyester prepared by cross-linking a linear unsaturated resin (hereinafter called base resin) such as linear unsaturated polyester resin preferably with a chemical initiator in a melt mixing device such as, for example, an extruder at high temperature (e.g., above the melting temperature of the resin and preferably up to about 150° C. above that melting temperature) and under high shear.

In preferred embodiments, the base resin has a degree of unsaturation of about 0.1 to about 30 mole percent, preferably about 5 to about 25 mole percent. The shear levels should be sufficient to inhibit microgel growth above about 1.0 micron average particle diameter and to ensure substantially uniform distribution of the microgel particles. Such shear levels are readily available in melt mixing devices such as twin-screw extruders.

The toner resin of this invention preferably has a weight fraction of the microgel (gel content) in the resin mixture in the range typically from about 0.001 to about 50 weight percent, preferably about 0.1 to about 40 weight percent. The linear portion is comprised of the linear unsaturated base resin, preferably unsaturated polyester, in the range from about 50 to about 99.999 percent by weight of said toner resin, and preferably in the range from about 60 to about 99.9 percent by weight of the toner resin. The linear portion of the resin preferably consists essentially of low molecular weight reactive base resin which did not cross-link during the cross-linking reaction, preferably unsaturated polyester resin.

According to embodiments of the invention, the number-average molecular weight ($M_n$) of the linear portion as measured by gel permeation chromatography (GPC) is in the range typically from about 1,000 to about 20,000, and preferably from about 2,000 to about 5,000. The weight-average molecular weight ($M_w$) of the linear portion is in the range typically from about 2,000 to about 40,000, and preferably from about 4,000 to about 15,000. The molecular weight distribution ($M_w/M_n$) of the linear portion is in the range typically from about 1 to about 6, and preferably from about 1.4 to about 3.

The toner resin contains a mixture of cross-linked resin microgel particles and a linear portion as illustrated herein. In embodiments of the toner resin of the invention, the glass transition temperature ($T_g$) as measured by differential scanning calorimetry (DSC) is in the range typically from about 50° C. to about 70° C., and preferably from about 51° C. to about 60° C., and the melt viscosity as measured with a mechanical spectrometer at 10 radians per second is from about 5,000 to about 200,000 poise, and preferably from about 20,000 to about 100,000 poise, at 100° C.

The toner resin of the present invention can provide a low melt toner with a minimum fix temperature (MFT) of from about 100° C. to about 200° C., preferably about 100° C. to about 160° C., more preferably about 110° C. to about 140° C., provide the low melt toner with a wide fusing latitude to minimize or prevent offset of the toner onto the fuser roll, and maintain high toner pulverization efficiencies. The low melt toner resin preferably has a fusing latitude greater than 10° C., preferably from about 10° C. to about 120° C., and more preferably more than about 20° C. and even more preferably more than about 30° C. The MFT of the toner is not sensitive to the cross-linking in the microgel particles of the toner resin, while the fusing latitude increases significantly as a function of the cross-linking or concentration of microgels in the toner resin. Thus, it is possible to produce a series of toner resins and thus toners with the same MFT, but with different fusing latitudes. Toner resins and thus toners of the present invention show minimized or substantially no vinyl offset.

As the degree of cross-linking or microgel content increases, the low temperature melt viscosity does not change appreciably, while the high temperature melt viscosity rises. Also, the hot offset temperature is increased with the presence of microgel particles which impart elasticity to the resin. With a higher degree of cross-linking or microgel content, the hot offset temperature increases.

In a preferred embodiment, the cross-linked portion consists essentially of very high molecular weight microgel particles with high density cross-linking (as measured by gel content) and which are not soluble in substantially any solvents such as, for example, tetrahydrofuran, toluene and the like. As discussed above, the microgel particles are highly cross-linked polymers with a very small, if any, cross-link distance. This type of cross-linked polymer may be formed by reacting chemical initiator with linear unsaturated polymer, and more preferably linear unsaturated polyester, at high temperature and under high shear. The initiator molecule breaks into radicals and reacts with one or more double bond or other reactive site within the polymer chain forming a polymer radical. This polymer radical reacts with other polymer chains or polymer radicals many times, forming a highly and directly cross-linked microgel. This renders the microgel very dense and results in the microgel not swelling very well in solvent. The dense microgel also imparts elasticity to the resin and increases its hot offset temperature while not affecting its minimum fix temperature.

The weight fraction of the microgel (gel content) in the resin may be determined according to the procedure outlined in U.S. Pat. No. 5,227,460, incorporated herein by reference in its entirety.

In the most preferred embodiment, linear unsaturated polyesters are used as the base resin. These linear unsaturated polyesters are low molecular weight condensation polymers which may be formed by the step-wise reactions between both saturated and unsaturated diacids (or anhydrides) and dihydric alcohols (glycols or diols). The resulting unsaturated polyesters are reactive (e.g., cross-linkable) on two fronts: (i) unsaturation sites (double bonds) along the polyester chain, and (ii) functional groups such as carboxyl, hydroxy, etc. groups amenable to acid-base reactions. Typical unsaturated polyester base resins useful for this invention are prepared by melt polycondensation or other polymerization processes using diacids and/or anhydrides and diols. Suitable diacids and dianhydrides include but are not limited to saturated diacids and/or anhydrides such as for example succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like and mixtures thereof; and unsaturated diacids and/or anhydrides such as for example maleic acid, fumaric acid, chloromaleic acid, methacrylic acid, acrylic acid, itaconic acid, citraconic acid, mesaconic acid, maleic anhydride, and the like and mixtures thereof. Suitable diols include but are not limited to for example propylene glycol, ethylene glycol, diethylene glycol, neopentyl glycol, dipropylene glycol, dibromoneopentyl glycol, propoxylated bisphenol A, ethoxylated bisphenol A and other alkoxylated bisphenol A diols, 2,2,4-trimethylpentane-1,3-diol, tetrabromo bisphenol dipropoxy ether, 1,4-butanediol, and the like and mixtures thereof, soluble in good solvents such as, for example, tetrahydrofuran, toluene and the like.

Preferred unsaturated polyester base resins are prepared from diacids and/or anhydrides such as, for example, maleic anhydride, fumaric acid, and the like and mixtures thereof, and diols such as, for example, propoxylated bisphenol A, propylene glycol, and the like and mixtures thereof A particularly preferred polyester is poly(propoxylated bisphenol A fumarate).

The poly(propoxylated bisphenol A fumarate) is propoxylated in any conventional manner. Most preferably, propylene carbonate is used as the propoxylating agent as it yields a propoxylated product with a desirable diol distribution ideal for use in the cross-linking step and in the toner resins.

In a preferred embodiment, the linear unsaturated polyester is prepared according to U.S. Pat. No. 6,063,827, hereby incorporated by reference in its entirety.

The cross-linking which occurs in the process of the invention is characterized by one reactive site (e.g., one unsaturation) within a polymer chain reacting substantially directly (e.g., with no intervening monomer(s)) with one reactive site within a second polymer chain, and by this reaction occurring repeatedly to form a network of cross-linked units. This polymer cross-linking reaction may occur by a number of mechanisms as explained in U.S. Pat. No. 5,227,460.

The chemical initiators for making the cross-linked toner resins of the invention must be liquid chemical initiators capable of being sprayed onto the linear unsaturated polyester resin. Most preferably, the liquid chemical initiator is 1,1-di(t-butyl peroxy)-3,3,5-trimethylcyclohexane. Such an initiator is available commercially from Elf-Atochem under the tradename L231.

The liquid chemical initiator is preferably used in low concentrations. The amount of initiator used is directly proportional to the degree of cross-linking, and thus the gel content of the cross-linked resin. The amount of initiator used may range from, for example, about 0.01 to about 10 weight percent, and preferably in the range from about 0.1 to about 4 weight percent. In the cross-linking, substantially all of the initiator is used up, and thus there are substantially no residual amounts of unused initiator in the cross-linked product. Since the cross-linking can be carried out at high temperature, the reaction is very fast (e.g., less than 10 minutes, preferably about 20 seconds to about 2 minutes residence time) and thus virtually no unreacted initiator remains in the product.

Use of 1,1-di(t-butyl peroxy)-3,3,5-trimethylcyclohexane as the initiator provides several advantages, including unexpected advantages, with respect to the cross-linked toner resin achieved.

First, use of 1,1-di(t-butyl peroxy)-3,3,5-trimethylcyclohexane provides a chemical initiator that generates by-products during the cross-linking that are easily removed as volatiles from the cross-linked toner resin. The by-products, for example t-butanol and acetone, of the initiator are very volatile compounds that can be removed without difficulty, for example using a vacuum system in association with the extruder, from the cross-linked toner resin. The resultant cross-linked toner resin is thus substantially free of by-products of the chemical initiator, i.e., the resin contains less than about 0.25 weight percent, preferably less than about 0.10 weight percent, of residual chemical initiator and by-products of the initiator.

Related to the foregoing is an advantage that the use of 1,1-di(t-butyl peroxy)-3,3,5-trimethylcyclohexane has over the use of the conventionally used benzoyl peroxide as the chemical initiator. Benzoyl peroxide generates benzoic acid as a by-product, which is undesirable for several reasons. First, benzoic acid is difficult to remove from the cross-linked resin in that it condenses rapidly in a vacuum system, rapidly clogging the system and requiring frequent apparatus shut downs for cleaning. Second, as a result of the difficulty in removal of the benzoic acid by-product, the cross-linked toner resin contains a significant amount of acids, i.e., acidic by-products of the benzoyl peroxide, for example on the order of 0.25 weight percent of the resin or more. Such acidity has been found by the present inventors to negatively affect the charging, the humidity sensitivity of the charging and the background density properties of toners prepared from cross-linked toner resins containing such levels of acids. As the level of gel content in the toner resin is dependent on the level of initiator used as discussed above, the amount of benzoyl peroxide used cannot be reduced in order to reduce the acidity without also adversely affecting these same copy quality attributes as a result of the lower gel content.

Thus, in the present invention, 1,1-di(t-butyl peroxy)-3,3,5-trimethylcyclohexane is used, and the cross-linked toner resin obtained is substantially free of acid substituents, in particular substantially free of acid by-products of the initiator. By this is meant that the cross-linked toner resin contains less than 0.20 percent by weight, preferably less than 0.10 percent by weight, most preferably less than 0.05 percent by weight, of acids. Most preferably, the cross-linked toner resin contains no benzoic acid.

Further, hydrated benzoyl peroxide is a shock hazard in that it dries out quickly. 1,1-di(t-butyl peroxy)-3,3,5-trimethylcyclohexane is not a shock hazard, and thus can be more safely handled than benzoyl peroxide.

The use of a liquid chemical initiator is advantageous over the use of a solid chemical initiator such as benzoyl peroxide. The liquid initiator can be sprayed onto the linear unsaturated polyester base resin during blending of the resin, which results in the initiator being uniformly distributed throughout the resin granules. A stable uniform distribution is not achievable with mere physical mixing of initiator granules with resin granules. Further, the liquid is absorbed into the granules, thus making the initiator inseparable from the resin. Solid initiators, on the other hand, are physically blended with the resin granules. However, in the feeder to the extruder, flow-induced granule separation can and does occur, which produces a large variability of initiator concentration with time into the extruder, and in turn results in a large variability in the gel content of the cross-linked toner resin. Flow-induced granule separation is eliminated in the present invention. The cross-linked toner resin of the present invention preferably exhibits a crosslink density variability of about 3% relative standard deviation or less. Thus, the cross-linked toner resin of the present invention derived from a liquid chemical initiator has a very uniform and consistent concentration of microgel particle distribution throughout.

The cross-linked resins of the invention are used in making toner. The resins are generally present in the toner in an amount of from about 40 to about 98 percent by weight, and more preferably from about 70 to about 98 percent by weight, although they may be present in greater or lesser amounts, provided that the objectives of the toner are achieved. For example, toner resins of the invention can be subsequently melt blended or otherwise mixed with a colorant, charge carrier additives, surfactants, emulsifiers, pigment dispersants, flow additives, and the like. The resultant product can then be pulverized by known methods such as milling to form toner particles. The toner particles preferably have an average volume particle diameter of about 5 to about 25, more preferably about 5 to about 15, microns.

Various suitable colorants can be employed in toners of the invention, including suitable colored pigments, dyes, and mixtures thereof including Carbon Black, such as Regal 330® carbon black (Cabot), Acetylene Black, Lamp Black, Aniline Black, Chrome Yellow, Zinc Yellow, Sicofast Yellow, Luna Yellow, Novaperm Yellow, Chrome Orange, Bayplast Orange, Cadmium Red, Lithol Scarlet, Hostaperm Red, Fanal Pink, Hostaperm Pink, Lithol Red, Rhodamine Lake B, Brilliant Carmine, Heliogen Blue, Hostaperm Blue, Neopan Blue, PV Fast Blue, Cinquassi Green, Hostaperm Green, titanium dioxide, cobalt, nickel, iron powder, Sicopur 4068 FF, and magnetites or iron oxides such as Mapico Black (Columbia), NP608 and NP604 (Northern Pigment), Bayferrox 8610 (Bayer), MO08699 (Mobay), TMB-100 (Magnox), MAT305K3 and MAT305J1L from Toda America, etc., mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight, for color toner and about 5 to about 60 percent by weight for black toner.

Various known suitable effective positive or negative charge enhancing additives can be selected for incorporation into the toner compositions of the present invention, preferably in an amount of about 0.1 to about 10, more preferably about 1 to about 4 percent by weight. Examples include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, U.S. Pat. No. 4,338,390, the disclosure of which is totally incorporated hereby by reference; cetyl pyridinium tetrafluoroborates; distearyl dimethyl ammonium methyl sulfate; aluminum salts such as Bontron E84™ or E88™, or TRH (Hodogaya Chemical); and the like. The toner resins of the present invention typically require lesser amounts of charge enhancing materials as a result of the toner resin having less acidity. This is because additional charge enhancing additives to offset the acidity do not have to be added to the toner resin of the present invention.

In addition, the toner resin of the present invention has surprising uniformity in composition, and thus the addition of additives to derive the desired toner properties, for example triboelectric properties, does not need to be adjusted on a batch specific basis as with prior art toner resins.

Other internal and/or external additives may be added in known amounts for their known functions.

The toners can be used as is in single component applications or the resulting toner particles optionally can be formulated into a two-component developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles which are positively charged will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, the entire disclosure of which is hereby totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are hereby totally incorporated herein by reference.

The selected carrier particles can be used with or without a coating, the coating generally being comprised of fluoropolymers, such as polyvinylidene fluoride resins, terpolymers of styrene, methyl methacrylate, a silane, such as triethoxy silane, tetrafluoroethylenes, other known coatings and the like.

The diameter of the carrier particles is generally from about 35 microns to about 1,000 microns, preferably about 90 microns, thus allowing these particles to possess sufficient density and inertia to avoid adherence to the electrostatic images during the development process. The carrier particles can be mixed with the toner particles in various suitable combinations. However, best results are obtained when about 1 part carrier to about 10 parts to about 200 parts by weight of toner are mixed.

Toners of the invention can be used in known electrostatographic imaging methods, although the fusing energy requirements of some of those methods can be reduced in view of the advantageous fusing properties of the toner of the invention as discussed herein. Thus for example, the toners or developers of the invention can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll at a temperature lower than 200° C., preferably lower than 160° C., more preferably lower than 130° C.

The toner resins of the present invention are fabricated by a reactive melt mixing process comprising the steps of: (1) spraying a liquid chemical initiator onto the unsaturated polyester resin, while blending, prior to, during or subsequent to melting of the unsaturated polyester resin to form a polymer melt; and (2) subsequently cross-linking the polymer melt under high shear to form the cross-linked toner resin. During the cross-linking, the polymer melt is kept in the melt mixing device for a sufficient residence time that partial cross-linking of the base resin and complete reaction of the initiator may be achieved, and sufficiently high shear is preferably provided during the cross-linking reaction, thereby keeping gel particles formed during cross-linking small in size and well distributed in the polymer melt.

In the process of the present invention, the fabrication of the cross-linked resin may be carried out in a melt mixing device, preferably an extruder. Generally, any high shear, high temperature melt mixing device suitable for processing polymer melts may be employed, provided that the objectives of the present invention are achieved. Examples of continuous melt mixing devices include single screw extruders or twin screw extruders, continuous internal mixers, gear extruders, disc extruders and roll mill extruders. Examples of batch internal melt mixing devices include Banbury mixers, Brabender mixers and Haake mixers. Preferably, a continuous extruder is used to manufacture the cross-linked toner resin.

One suitable type of extruder is the fully intermeshing co-rotating twin screw extruder such as, for example, the ZSK-30 twin screw extruder, available from Werner & Pfleiderer Corporation, Ramsey, N.J., U.S.A., which has a screw diameter of 30.7 millimeters and a length-to-diameter (L/D) ratio in this example of 37.2. The extruder can melt the base resin, mix the initiator into the base resin melt, provide high temperature and adequate residence time for the cross-linking reaction to be carried out, control the reaction temperature via appropriate temperature control along the extruder channel, devolatilize the melt to remove any volatile decomposition products, and pump the cross-linked polymer melt through a die such as, for example, a strand die to a pelletizer.

For chemical reactions in highly viscous materials, reactive extrusion is particularly efficient, and is advantageous because it requires no solvents, and thus is easily environmentally controlled. It is also advantageous because it permits an environment wherein a controlled high temperature (adjustable along the length of the extruder) is available so that a very quick reaction can occur. It also enables a reaction to take place continuously, and thus the reaction is not limited by the disadvantages of a batch process, wherein the reaction must be repeatedly stopped so that the reaction products may be removed and the apparatus cleaned and prepared for another similar reaction.

The barrel of the extruder may comprise modular barrel sections, each separately heated with a heater. With modular barrel sections, it is possible to locate feed ports and devolatilizing ports at required locations, and to provide segregated temperature control along the screw channel of the extruder. The screw may also be modular, enabling the screw to be configured with modular screw elements and kneading elements having the appropriate lengths, pitch angles, etc. in such a way as to provide optimum conveying, mixing, reaction, devolatilizing and pumping conditions, as well as optimizing the residence time for complete reaction.

The spraying of the liquid chemical initiator, preferably 1,1-di(t-butyl peroxy)-3,3,5-trimethylcyclohexane, can be done by any suitable method. In a first embodiment, the liquid initiator may be sprayed onto the resin granules in a blender, for example, a Marion blender or a Littleford blender. During the several minutes needed to spray the required dose of liquid initiator into the resin, the blender is operated to mix the resin granules, and the surface of all of the resin granules are thus repeatedly exposed to the spray. This achieves a uniform deposit of the initiator on the surfaces of the resin granules. As the initiator has an affinity for the linear unsaturated polyester resin, it is adsorbed into the surface of the resin granules. During subsequent cross-linking of the resin, it is thus not possible for a segregation of the initiator from the resin to occur.

In a second embodiment, the blender is a flow-through Ribbon blender operated directly in-line with and immediately before the extruder. The liquid initiator is sprayed onto the resin as it passes through the ribbon blender.

In a third embodiment, the liquid initiator is injected into the extruder at or before the point where the resin has been melted and heated to the temperature where initiation of the reaction is desired, i.e., the initiator is injected directly into the molten resin in the extruder.

Of course, other suitable methods of spraying the liquid chemical initiator onto the resin may also be used.

In operation, the components to be reacted and extruded, e.g., the base resin (and sprayed-on chemical initiator, if the resin is treated prior to entering the extruder), enter the extrusion apparatus from an upstream supply port and/or second downstream supply port. The base resin, usually in the form of solid pellets, chips, granules, or other forms can be fed to the first upstream supply port and second downstream supply port by starve feeding, gravity feeding, volumetric feeding, loss-in-weight feeding, or other known feeding methods. After the base resin has been fed into the screw channel, the resin is melted. Heating takes place from two sources: (1) external barrel heating from heaters, and (2) internal heating from viscous dissipation within the polymer melt itself When the temperature of the molten resin and initiator reach a critical point, onset of the cross-linking reaction takes place. It is preferable, although not absolutely necessary, that the time required for completion of the cross-linking reaction not exceed the residence time in the extruder. The rotational speed of the extruder screw preferably ranges from about 50 to about 500 revolutions per minute, preferably from about 200 to about 300 RPM.

Because of slight but significant differences between the cross-linking reactivity of benzoyl peroxide and other initiators, it may be necessary to modify the extruder to provide sufficient residence time at elevated temperature to allow the reaction to reach completion and to completely consume the supply of initiator. In the present invention, 1,1-di(t-butyl peroxy)-3,3,5-trimethylcyclohexane was found to react more slowly than benzoyl peroxide. To compensate for this, the extruder screws may be modified to provide more shear mixing and heating in the initial portion of the extruder and longer residence time overall, but especially in the first 1/3 of the extruder. In the preferred extruder design for 1,1-di(t-butyl peroxy)-3,3,5-trimethylcyclohexane, the residence time in the first 1/3 of the screw is 10 seconds compared to 6 seconds for the benzoyl peroxide screw. At this point in the extruder, the melt temperature is 400° F. in the preferred process using 1,1-di(t-butyl peroxy)-3,3,5-trimethylcyclohexane, while the melt temperature is only 300° F. in the process using benzoyl peroxide. By these process changes, compensation may be made for the slightly lower reactivity of 1,1-di(t-butyl peroxy)-3,3,5-trimethylcyclohexane with the inventive unsaturated polyester resin to achieve the desired degree of crosslinking and consumption of initiator.

Volatiles, including initiator by-products may be removed through a downstream devolatilizer by applying a vacuum. At the end of screw channel, the cross-linked resin is pumped in molten form through a die, such as for example a strand die, to a pelletizer such as, for example, a water bath pelletizer, underwater granulator, or belt cooler.

The barrel temperature, which may be controlled by thermocouples and generated in part by heaters, is from about 40° C. to about 250° C. The temperature range for mixing the base resin and initiator in the upstream barrel zones is from about the melting temperature of the base resin to below the cross-linking onset temperature, and preferably within about 40° C. of the melting temperature of the base resin. For example, for an unsaturated polyester base resin the temperature is preferably about 90° C. to about 130° C. The temperature range for the cross-linking reaction in the downstream barrel zones is above the cross-linking onset temperature and the base resin melting temperature, preferably within about 200° C. The die or head pressure generator of the extruder may generate pressure from about 0 pounds per square inch to about 1,500 pounds per square inch depending on the die used.

Thus, in a process of this invention, a reactive base resin and a chemical initiator are fed to a reactive melt mixing apparatus and cross-linking is carried out at high temperature and high shear to produce a cross-linked resin which enables the preparation of low fix temperature toners with good fusing latitude, good vinyl offset, and improved background, charge distribution and humidity sensitivity by the use of liquid initiators such as 1,1-bis(t-butyl peroxy)-3,3,5-trimethylcyclohexane.

Cross-linked polymers so produced have the important rheological property of allowing a toner prepared therefrom to show low fix temperature and high offset temperature.

A number of the aspects of the overall print quality are affected by the details of the rheology of the toner, often characterized by the melt flow index (MFI), which, to first order, it is an accurate reflection of the Theological properties which control those aspects of the print quality. Toner resins prepared using benzoyl peroxide as an initiator at a given gel level need very good wax dispersion in order to insure freedom of the copies from marks made by the stripper fingers used to peel the prints off the fuser roll as they exit the fuser nip. The present inventors have found that these stripper finger marks are strongly dependent on toner rheology, in particular (melt flow index (MFI) divided by the equilibrium elastic modulus (Ge) of the resin and toner and less dependent on the wax dispersion for resins of the present invention. The equilibrium elastic modulus is determined from a series of elastic modulus measurements at different shear rates on a parallel plate rheometer such as a Rheometric Scientific Corporation Model ARES. The measurements and calculations are well known to those skilled in the art. As it is very difficult to control the wax dispersion in the toner extrusion process, utilizing toners of the present invention prepared via liquid reactive extrusion permits the surprising additional benefit of toner extrusion processing latitude in toner production plants.

It has been found that the resin of the present invention most preferably has a rheology such that the MFI is about 18 to about 20 g/10 min at 125° C. and 16.6 kg load, preferably about 19.5 g/10 min. and a Ge of about 65,000 to about 75,000 dyn/cm$^2$, preferably about 69,000 dyn/cm$^2$. Such a toner made from this resin satisfies both melt flow and stripper finger mark performance requirements for a toner, although the wax dispersion index is about 0.32%, higher than previous toners made using benzoyl peroxide as a solid initiator. However, the wax dispersion is for some reason less significant in controlling stripper finger marks when using toners based on the liquid chemical initiator, thereby enabling improved toner-processing latitude.

In addition to imparting a unique Theological property to the toner resin not attainable to date in conventional cross-linking processes for preparing toner resins, the reactive melt mixing process has several other important advantages in the context of the present invention. By choosing the type and molecular weight properties of the base resin, the minimum fix temperature can be easily manipulated. The hot offset temperature can be easily manipulated by the gel content in the cross-linked resin which can be controlled by the amount of initiator fed to the extruder. Thus, it is possible to produce a series of resins and thus toners with the same MFT (minimum fix temperature) but with different fusing latitudes. Cross-linking by the use of chemical initiators in the extruder is one of the cleanest means of modifying resin, since very low concentrations of initiators are used, often less than 4 percent by weight, and the residual contaminants of the cross-linking reaction are minimal.

An additional advantage of the use of 1,1-bis(t-butyl peroxy)-3,3,5-trimethylcyclohexane is the fact that the toners derived from the cross-linked resin exhibit reduced humidity sensitivity, reduced A(t) variation at extreme temperature/humidity conditions, reduced background at extreme temperature/humidity conditions, improved toner concentration latitude at extreme temperature/humidity conditions and improved transfer efficiency. Furthermore, it has been found that the extruder requires less maintenance, the gel content variability is lower, and the initiator handling is safer with the liquid-initiated process than with the benzoyl peroxide process.

The invention will further be illustrated in the following, non-limiting examples, it being understood that these examples are intended to be illustrative only and that the invention is not intended to be limited to the materials, conditions, process parameters and the like recited herein. Parts and percentages are by weight unless otherwise indicated.

EXAMPLE 1

In an illustrative example of the present invention, 0.38% by weight of 1,1-bis(t-butyl peroxy)-3,3,5-trimethylcyclohexane initiator is spray-coated onto granular unsaturated poly(propoxylated bisphenol A fumarate) resin in a Marion blender. This blend is fed at 200 grams per minute into the ZSK-30 twin-screw extruder described above running at 300 RPM. Vacuum is applied at the $10^{th}$ barrel to remove residual volatiles. A maximum melt temperature of 185° C. is observed in the final section of the extruder, and the torque averaged 68% during the run. At the end of two days of running, the extruder vacuum port and system are found to be completely free of any solid deposits or contamination such as benzoic acid and the like.

The resulting cross-linked resin contains 35.6% gel by toluene extraction and has a melt-flow index of 8.6 g/10 mins at 117° C. and 16.6 kg load. No residual initiator is detectable, and residual decomposition products are measured at 335 parts per million by weight.

A toner is prepared from this resin by compounding it with 5% R330 carbon black from Cabot, 4% 660P wax from Sanyo, and 4% AX8840 from Elf Atochem, followed by micronization and classification to 9 microns. In fusing tests in a Xerox 1090 copier, this test toner fused 25° C. below the control 1090 toner and had a fusing latitude greater than 60° C.

Comparison tests are run with control toner of the same formulation but compounded from resin crosslinked with benzoyl peroxide containing 37% gel. These tests produced minimum fix temperature and fusing latitude indistinguishable from the liquid-initiated test material. Also by comparison, after two days of running the extruder with benzoyl peroxide, the extruder vacuum port and system are found to be substantially clogged with benzoic acid deposits.

EXAMPLE 2

In this example, the effects of the presence of acid substituents in the toner resin are evaluated. To evaluate the effects, A(t) dependence upon acid concentration is evaluated, A(t) being defined as the product of the triboelectric value as measured by the known Faraday cage process and the sum of the measured toner concentration (TC) plus a constant value, as understood in the xerographic art.

In a comparative example, the effects of benzoic acid, for example as would be present in a toner resin prepared using benzoyl peroxide as the initiator, is evaluated. As shown in the results of FIG. 1, A(t) increases with increasing benzoic acid content, and thus A(t) is clearly a function of the acid percent.

Figure 2:
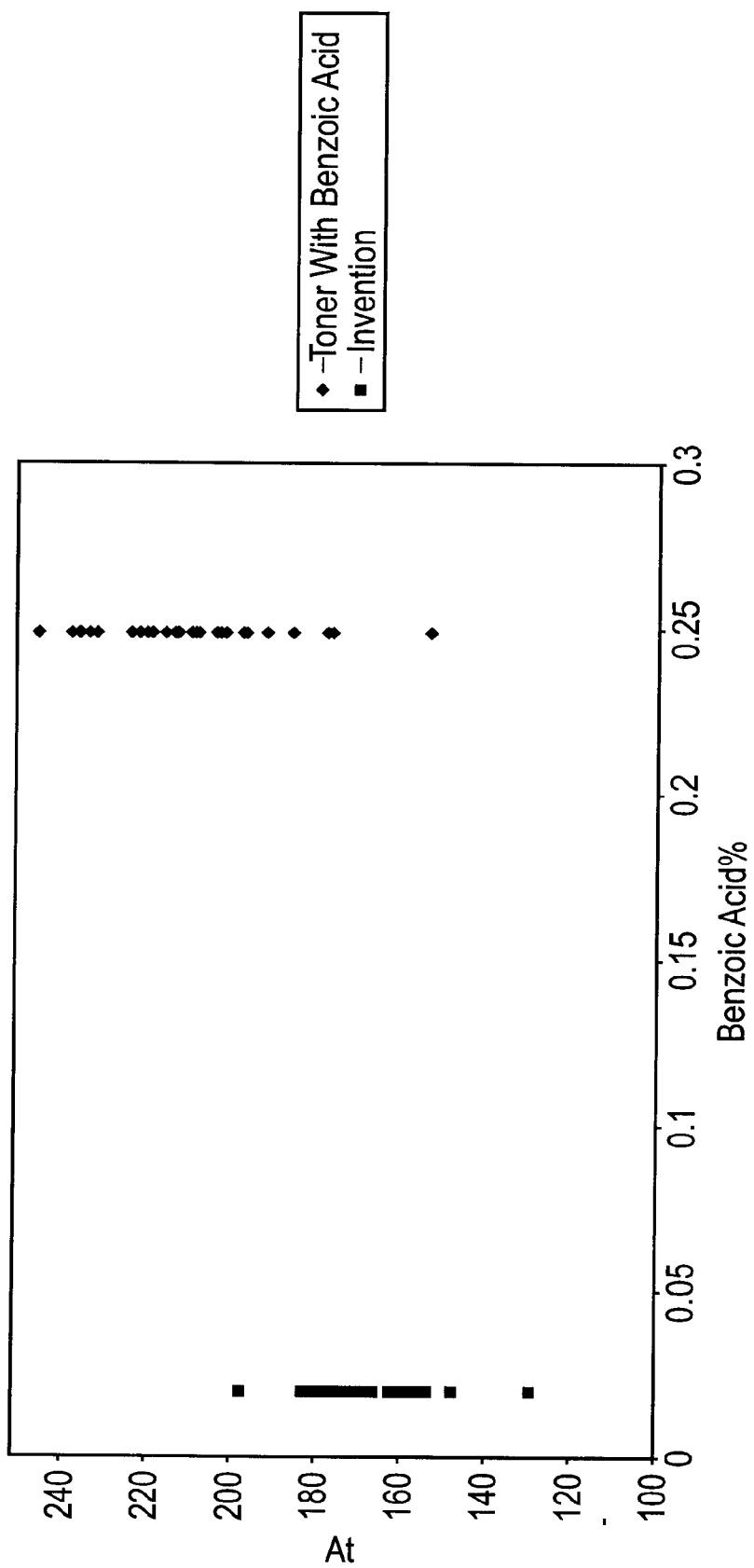
FIG. 2 graphically depicts the improved A(t) performance of toners prepared using the toner resin of the present invention, which contain significantly less benzoic acid.

A toner resin of the invention prepared using 1,1-bis(t-butyl peroxy)-3,3,5-trimethylcyclohexane as the initiator is then compared to a similar comparative toner resin using benzoyl peroxide as the initiator. The amount of initiator employed in both the example toner and comparative toner is from about 0.25% to about 0.40% by weight. In both, a linear unsaturated poly(propoxylated bisphenol A fumarate) is used as the base resin, although in the comparative resin, propylene oxide is used as the propoxylating agent whereas in the invention example, propylene carbonate is used as the propoxylating agent. The toner resin of the present invention contains substantially no benzoic acid (the amount reflected in FIG. 2 most likely merely being measurement noise from the test). The toner resin prepared by the benzoyl peroxide process contains approximately 0.25% benzoic acid. A multiplicity of data points are recorded for each toner, representing different times in several machine tests of each toner. These are exhibited in FIG. 2. The toner based on the liquid initiator has a lower and more tightly distributed A(t) than the toner produced from the benzoyl peroxide-produced resin. This in turn indicates that the toner resin of the present invention also exhibits improved charging, background and toner concentration latitude.

Figure 3:
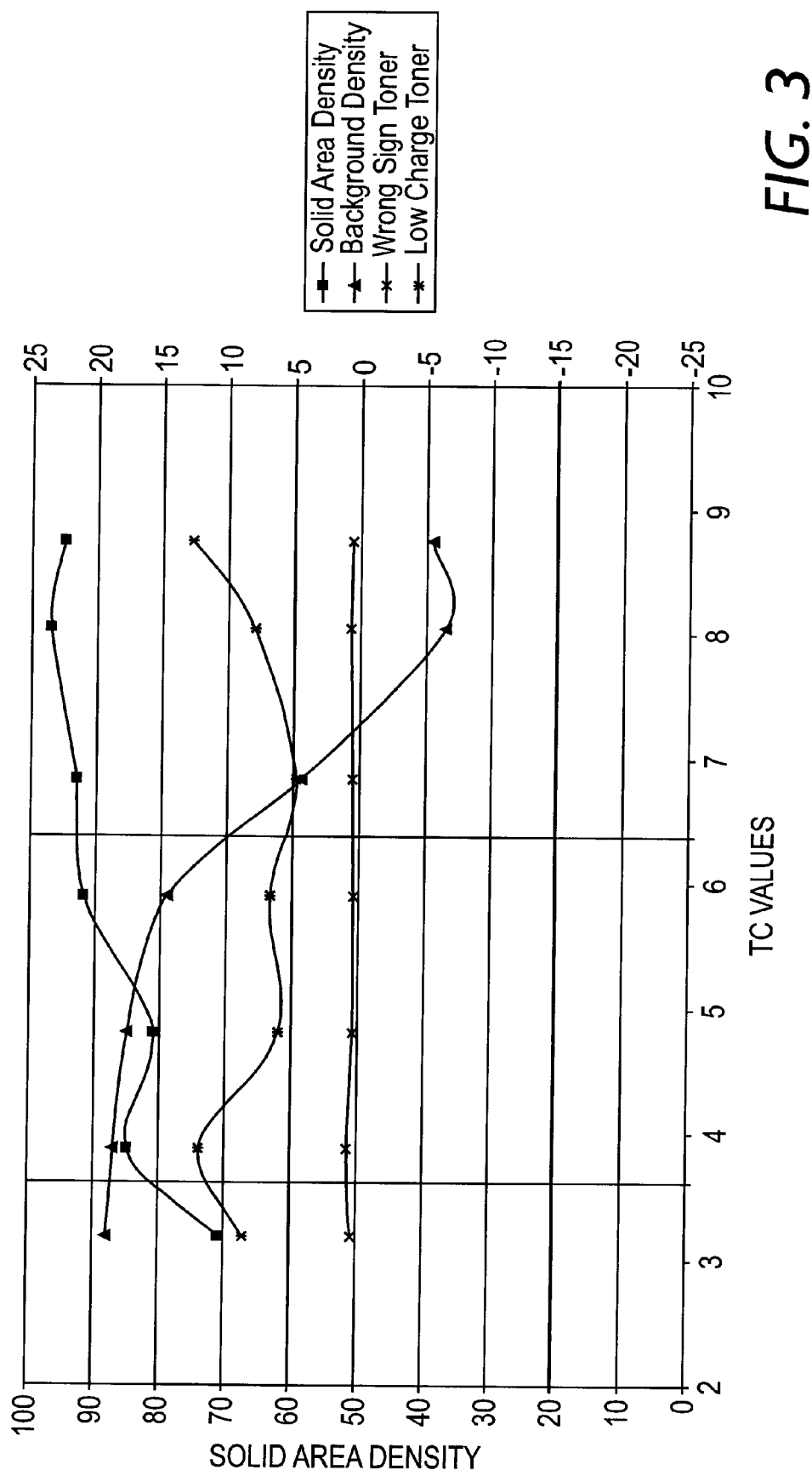
FIGS. 3 and 4 demonstrate the improved background density and other properties for toners of the present invention (3) compared to prior toners containing acids (4).
Figure 4:
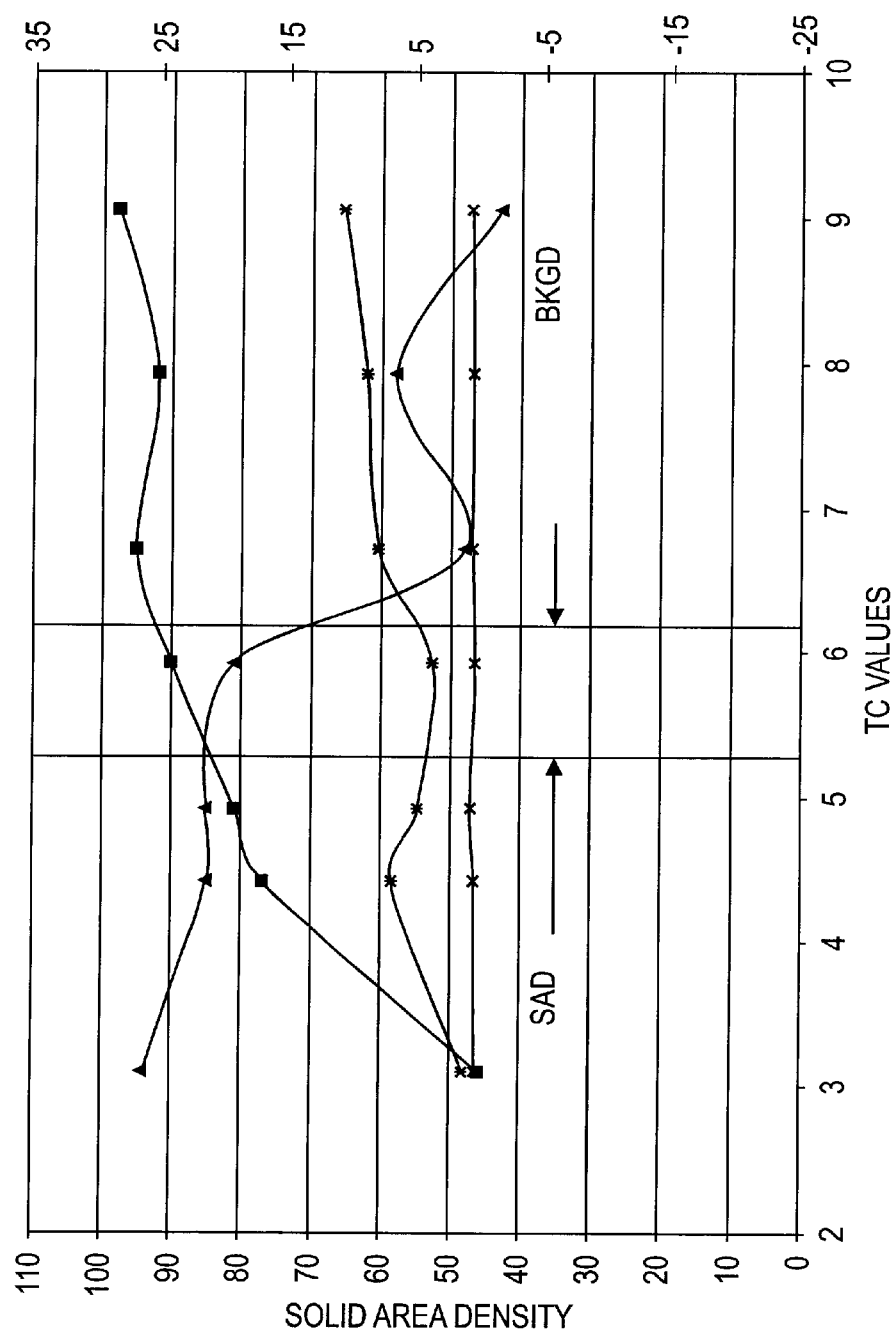
Figure 5:
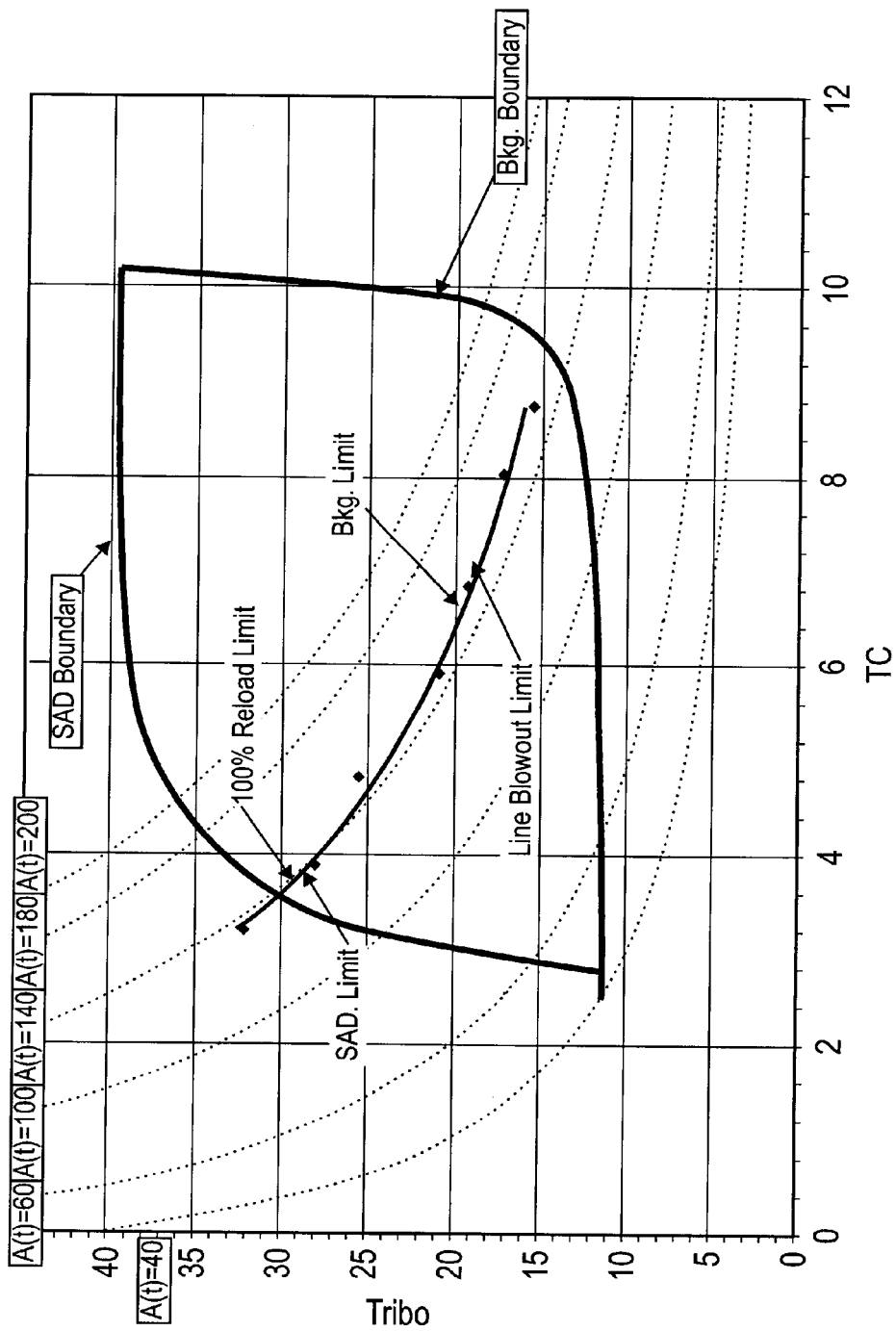
FIGS. 5 and 6 demonstrate the improved toner concentration latitude with toners of the present invention (5) compared to prior toners containing acids (6).
Figure 6:
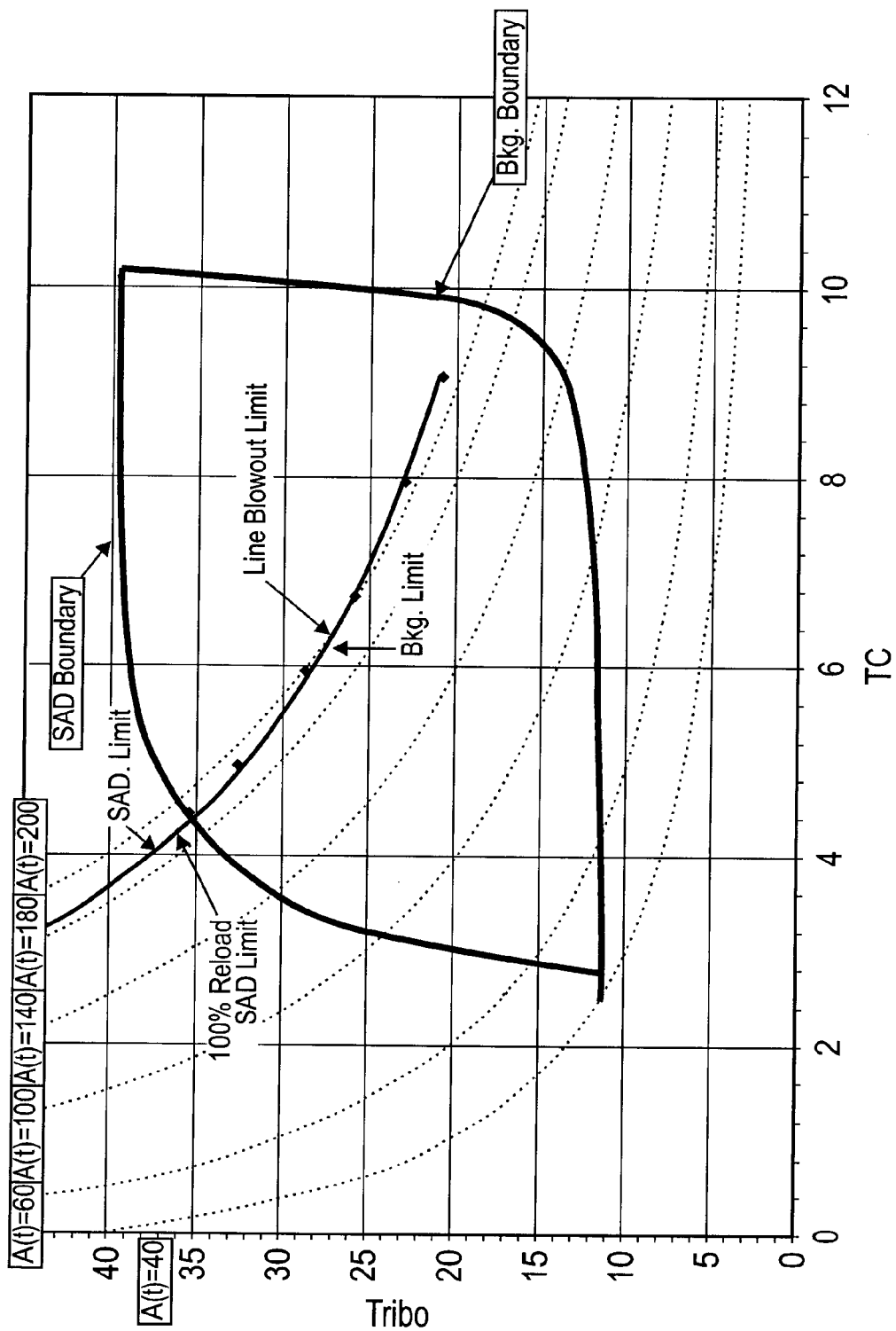
Figure 7:
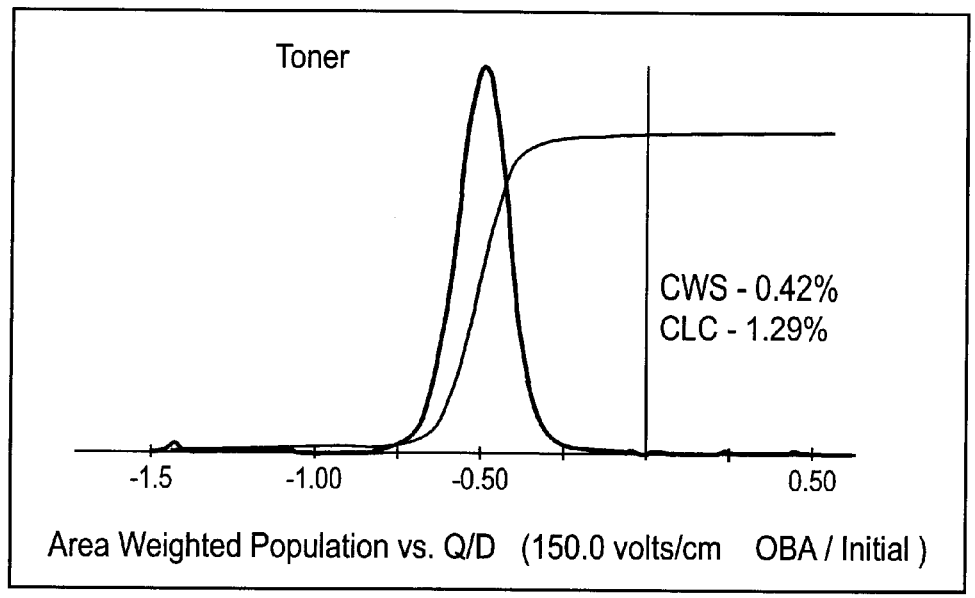
FIGS. 7–14 are charge spectra of toners of the invention (7–10) and the toners containing acids (11–14).
Figure 8:
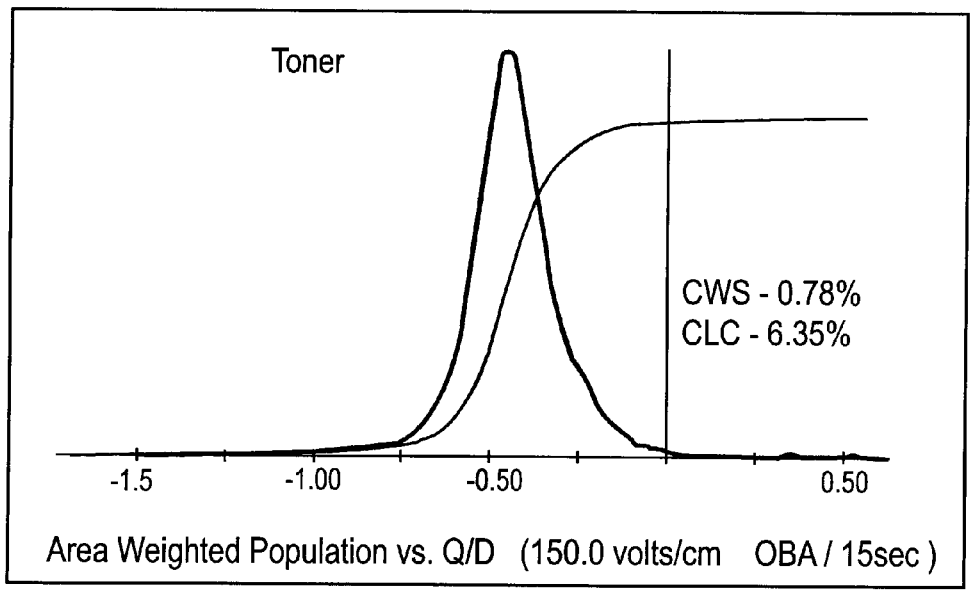
Figure 9:
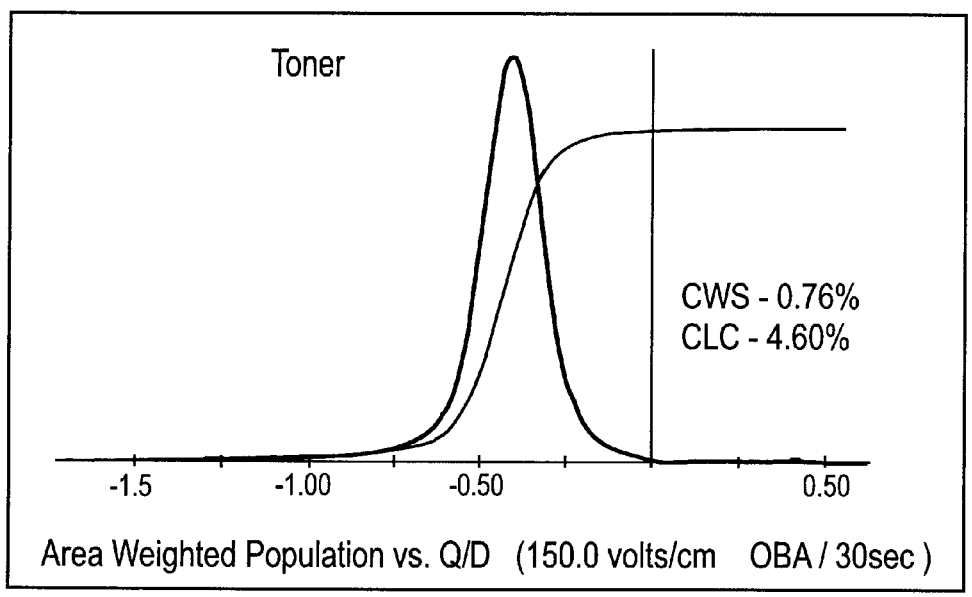
Figure 10:
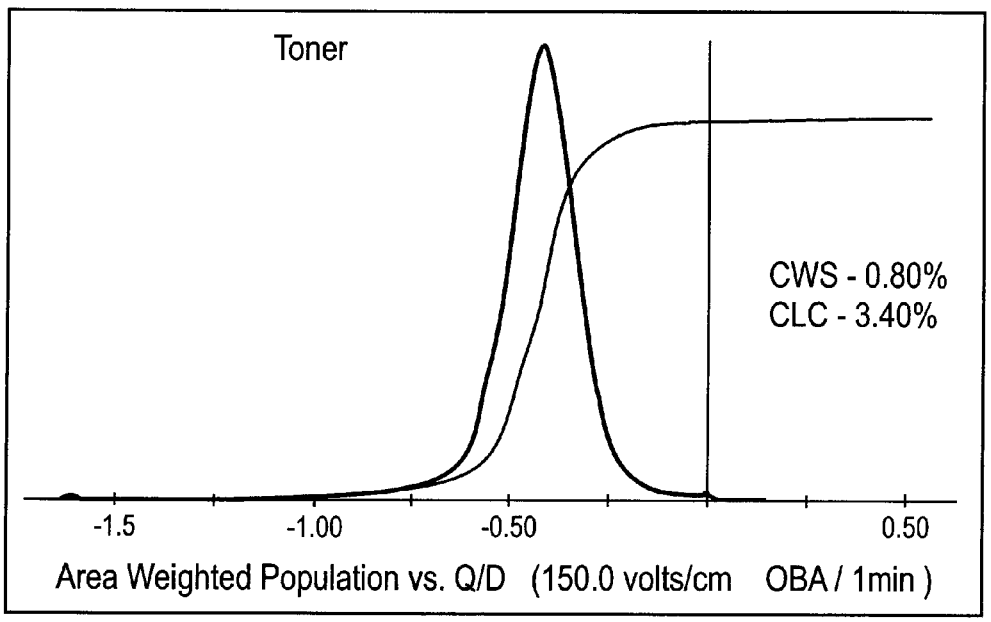
Figure 11:
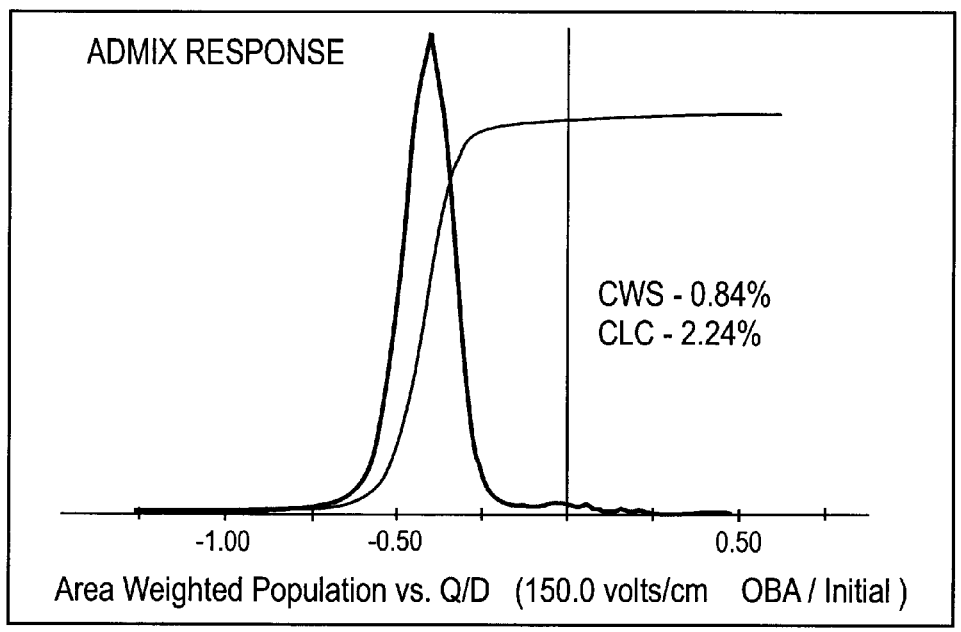
Figure 12:
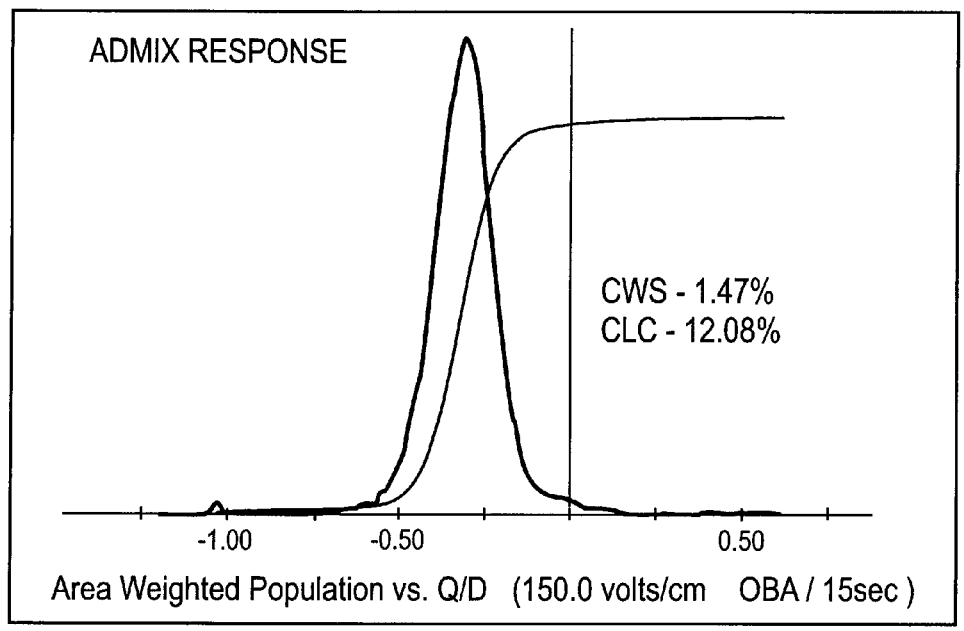
Figure 13:
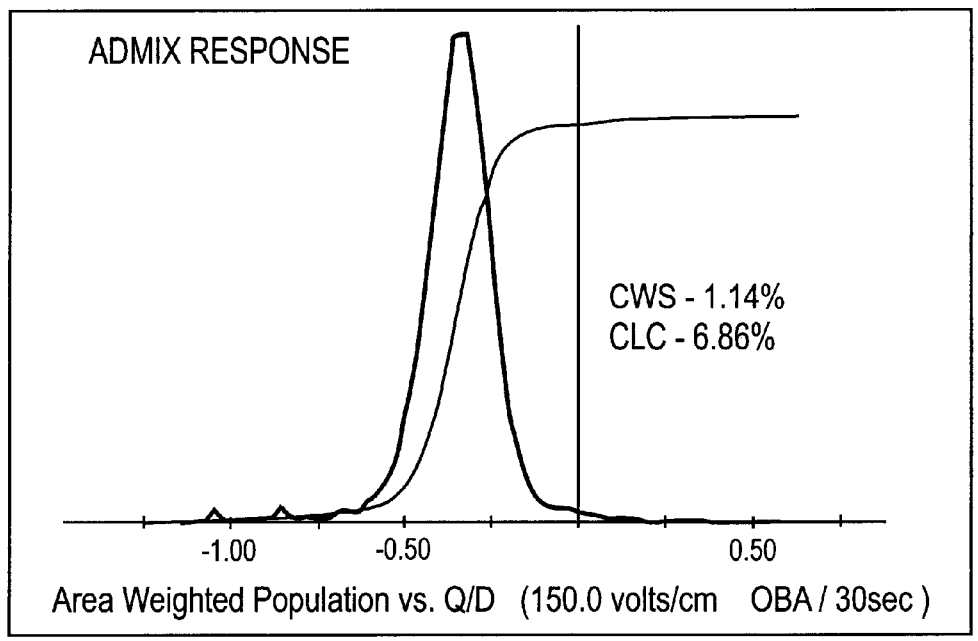
Figure 14:
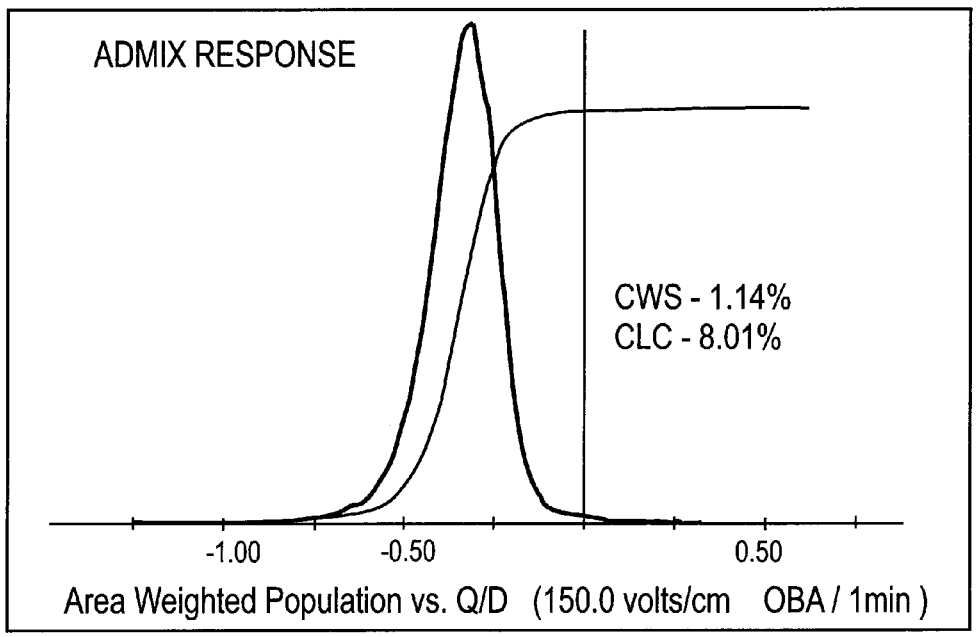

It is also found that the comparative toner resin containing benzoic acid has low charge toner particles, and the toner resin of the present invention that is substantially free of acids has improved low charge toner particles. This results in improved background performance in image quality tests with the toner resin of the present invention. See the results in FIG. 3 (invention) and FIG. 4 (toner containing benzoic acid) regarding the background density. These Figures also illustrate improvements in the properties of solid area density (SAD), corrected wrong sign toner (CWS) and corrected low charge toner (CLC). Background density and SAD are measured through an automatic scan of the document, while the charge distribution of the toner is measured to obtain CWS and CLC. These charging characteristics in turn have an impact on toner concentration latitude of the toner, with toner resins of the present invention enabling a wider latitude (FIG. 5) as compared to prior toner resins, i.e., toner containing benzoic acid) (FIG. 6). To obtain these Figures, the image quality of each of the toners is evaluated under stress conditions to determine the limits.

Further, machine test data show a significant improvement for transfer efficiency of toners of the present invention. Transfer efficiency is defined as the ratio of residual mass area (RMA) and developed mass area (DMA) from the photoreceptor. Toners of the present invention exhibit a transfer efficiency of about 97%, while toners prepared from resins cross-linked with benzoyl peroxide, and thus containing acids, exhibit a transfer efficiency of only about 88%.

FIGS. 7–14 are charge spectra or charge distributions. FIGS. 7–10 for the invention and FIGS. 11–14 for the prior art toners from benzoyl peroxide. As can be seen by comparing FIGS. 7 and 11, FIGS. 8 and 12, FIGS. 9 and 13, and FIGS. 10 and 14, the toners of the invention have less CWS and CLC, and thus exhibit surprisingly improved charging characteristics compared to the prior art.

EXAMPLE 3

In this example, the cross-link density variability of the toner resin of present invention is evaluated.

Figure 15:
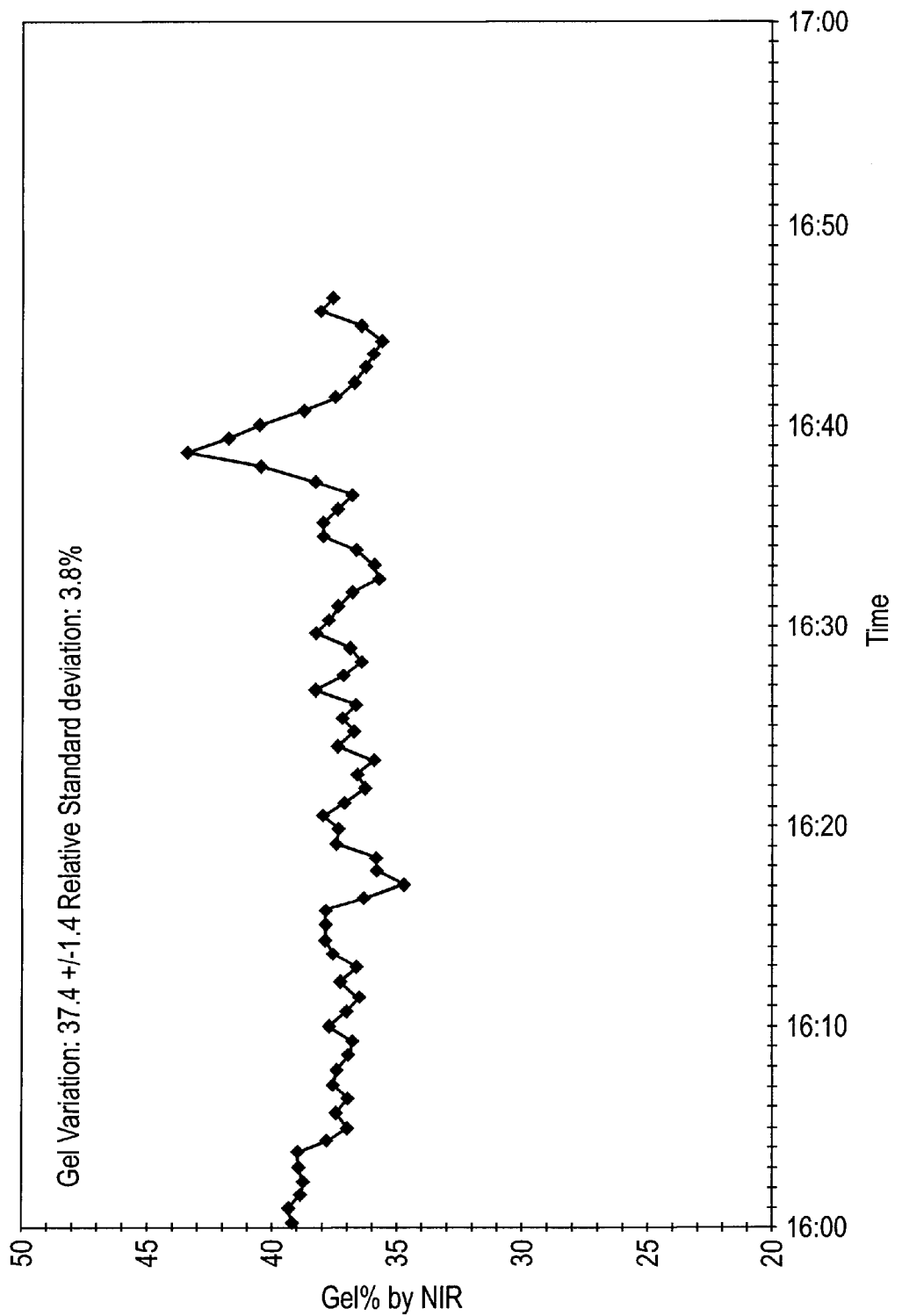
FIG. 15 is a summary of measurements of cross-link density concentration variation with extrusion time (i.e., gel content variation) for a comparative toner resin prepared using benzoyl peroxide initiator.

1,1-bis(t-butyl peroxy)-3,3,5-trimethylcyclohexane is sprayed onto an unsaturated poly(propoxylated bisphenol A fumarate) resin in a blender. Subsequently, the resin and initiator are fed to an extrusion reactor where cross-linking occurs. Measurements of cross-link density concentration variation (i.e., gel content variation) are taken at 40 second intervals throughout the reaction run using an on-line near infrared (NIR) spectrometer. As shown in FIG. 15, the relative standard deviation from the cross-link density is 2.2%.

Figure 16:
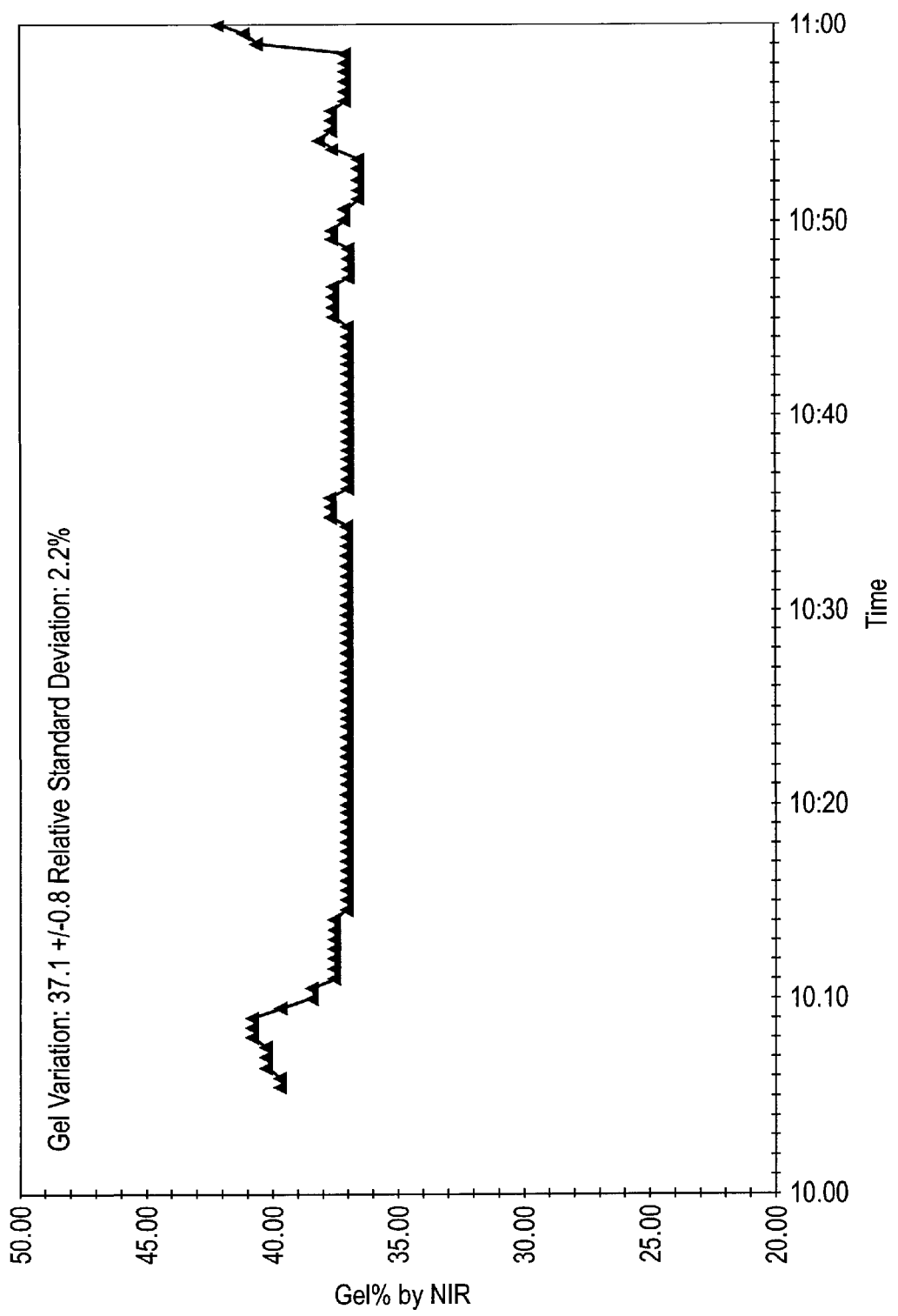
FIG. 16 is a summary of measurements of cross-link density concentration variation with extrusion time (i.e., gel content variation) for a toner resin of the present invention.

By comparison, a similar reaction run in which a similar gel content is sought in the cross-linked resin but using benzoyl peroxide as the initiator yielded a much higher relative standard deviation, on the order of 3.8% as shown in FIG. 16.

A comparison of FIGS. 15 and 16 thus demonstrates that the processing method of the present invention using 1,1-bis(t-butyl peroxy)- 3,3,5-trimethylcyclohexane permits a toner resin to be achieved that is much more uniform in gel content compared to toner resins prepared by prior art conventional mixing processes, particularly using solid granular initiators such as benzoyl peroxide as an initiator.

EXAMPLE 4

In this Example, toner of the present invention prepared from the inventive toner resin is evaluated for toner fix and offset properties.

The resin of the toner of the invention is prepared from poly(propoxylated bisphenol A fumarate) (propylene carbonate is used as the propoxylating agent) and 1,1-bis(t-butyl peroxy)-3,3,5-trimethylcyclohexane to have a gel content of 40% and a melt flow index (MFI) of 7.2 at 125° C. with 16.6 kg. To 57% of this toner resin is added 34% MAT305J1L spherical 0.23 $\mu$m magnetite coated with isopropyltridioctyl pyrophosphato titanate, 5% 550P polypropylene wax from Sanyo Corporation, 4% TRH (3-hydroxyl-4-(2-hydroxy-3,5-dinitrophenylazo-N-phenyl-2-napthalenecarboxamidato-2-hydrogen-chromate) from Hodogaya Corporation, and external additives of 0.5% R812 Aerosil® silica from Degussa Corporation and 2.5% strontium titanate ($SrTiO_3$) from Ferro Corporation to form the toner. This toner is identified as #1 Present Resin in FIG. 17.

As a comparison, two other toners are also evaluated. A comparative toner identified in FIG. 17 as #2 Kao Resin is made from a Kao resin based toner comprised of 57% Kao polyester resin from Kao Corporation, 4% TRH, 5% 550P, 34% MAT305J1L, 0.5% R812 Aerosil® and 2.5% strontium titanate.

Figure 17:
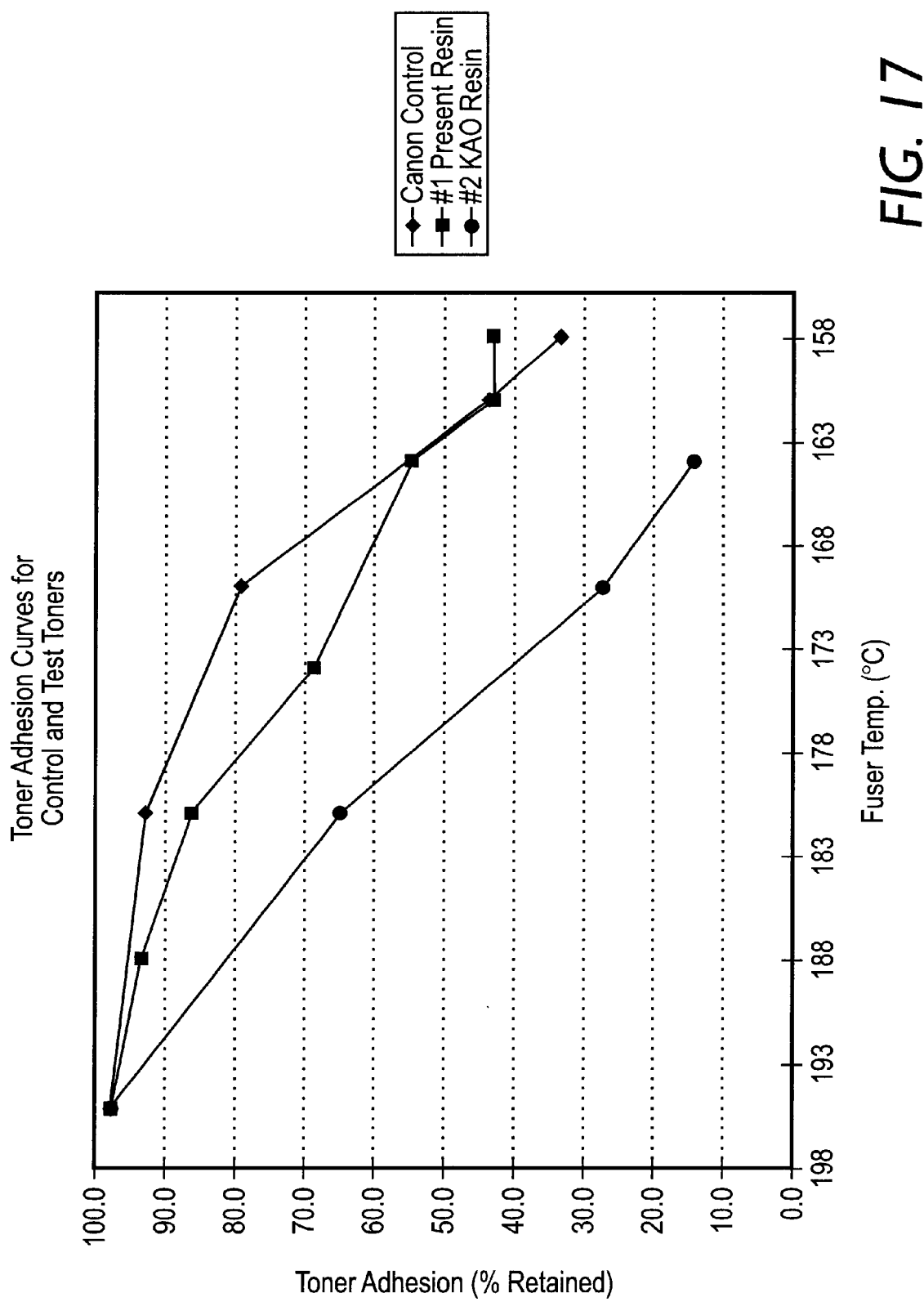
FIG. 17 is a toner adhesion curve for toners of the present invention and comparative toners.

A commercially evaluated Canon comparative toner, comprised of bisphenol A/propane diol/terephthalic acid/succinic acid/trimellitic acid resin, magnetite, propylene wax, and silica and strontium titanate external additives, is also evaluated; it is identified in FIG. 17 as Canon Control.

Each toner and comparative toner is used to form images using a Canon NP8580 machine having a Teflon sleeved fuser roll. The fix, or percentage of retained toner, is determined by measuring the density of 90.25 inch by 0.25 inch solid area squares. Then, Scotch tape is placed on the squares, pressed down and slowly pulled off at an angle of greater than 270 degrees. The density is again measured, and the fix calculated by taking the ratio of the average density after the tape to before the tape. A value of 100% represents perfect fix.

As shown in FIG. 17, the toner of the invention (#1) exhibits a fix curve very similar to the fix curve of the comparative Canon toner, and like the Canon toner, the toner of the invention does not exhibit toner offset to the Canon fuser roll, and also does not exhibit toner offset to a Katun after market fuser roll (a metal loaded Teflon fuser roll). Thus, the liquid extrusion based toner of the present invention gives much better fix and prevents offsetting of toner to the back of the copy after shutdown, unlike the prior reactive extrusion based toner (not shown here) or the comparative Kao based toner and the commercial Canon toner shown in FIG. 17.

EXAMPLE 5

In this example, a preferred toner of the invention is compared against comparative toners for relative humidity performance.

The toner of the invention, Toner A, is comprised of poly(propoxylated bisphenol A fumarate) (propylene carbonate is used as the propoxylating agent) and 1,1-bis(t-butyl peroxy)-3,3,5-trimethylcyclohexane to have a gel content of 40% and a melt flow index (MFI) of 7.2 at 125° C. with 16.6 kg. To 57% of this toner resin is added 34% MTH009F spherical uncoated 0.23 $\mu$m magnetite, 5% 550P polypropylene wax from Sanyo Corporation, 4% TRH (3-hydroxyl-4-(2-hydroxy-3,5-dinitrophenylazo-N-phenyl-2-napthalenecarboxamidato-2-hydrogen-chromate) from Hodogaya Corporation, and external additives of 0.5% R812 Aerosil® silica from Degussa Corporation and 2.5% strontium titanate ($SrTiO_3$) from Ferro Corporation to form the toner.

A comparative Toner B is prepared identically to Toner A, with the exception that the resin is replaced with a resin comprised of poly(propoxylated bisphenol A fumarate) crosslinked using benzoyl peroxide having a gel content of 39%.

The Canon toner from Example 3 above is also used as a comparative toner, Toner C.

The solid area density of images formed with a NP8580 device using each of the toners is evaluated at different temperatures and humidities, and the results are summarized in the following Table. SAD=solid area density; the first number represents ° F., and the second number represents relative humidity (i.e., 70/50 is 70° F. and 50% relative humidity).

TABLE

| TONER | SAD 70/50 | SAD 80/10 | SAD 80/80 DAY 1/DAY 2 |
|---|---|---|---|
| A | 1.39–1.43 | 1.45 | 1.44/1.42 |
| B (Comp.) | 1.40 | 1.44 | 1.29/ N/A |
| C (Comp.) | 1.36 | 1.37 | 1.31/1.20 |

From the Table, it is evident that the toner of the invention possesses much better performance at higher humidity conditions than prior toners. There is a particularly surprising enhancement in solid area density at 80/80. Thus, in addition, the toner of the invention exhibits excellent solid area density over a broad range of conditions, the solid area density dropping only slightly even at severe conditions of 80° F. and 80 percent relative humidity.

Although the invention has been described with reference to specific preferred embodiments, it is not intended to be limited thereto, rather those having ordinary skill in the art will recognize that variations and modifications may be made therein which are within the spirit of the invention and within the scope of the claims.

What is claimed is:

1. A toner resin cross-linked with a chemical initiator and consisting essentially of linear portions and cross-linked portions, wherein the toner resin is an unsaturated polyester resin, wherein the cross-linked portions consist essentially of high density cross-linked microgel particles, wherein the cross-linked toner resin contains less than 0.20 percent by weight of acids, and wherein the cross-linked toner resin has a cross-link density relative standard deviation of 3% or less.

2. The cross-linked toner resin according to claim 1, wherein the unsaturated polyester resin is a poly (propoxylated bisphenol A fumarate).

3. The cross-linked toner resin according to claim 1, wherein the cross-linked toner resin contains less than 0.10 percent by weight of acids.

4. The cross-linked toner resin according to claim 1, wherein the cross-linked toner resin contains less than 0.05 percent by weight of acids.

5. The cross-linked toner resin according to claim 1, wherein the cross-linked toner resin contains no benzoic acid.

6. The cross-linked toner resin according to claim 1, wherein the cross-linked toner resin contain less than 0.10 percent by weight of residual chemical initiator and by-products of the chemical initiator.

7. The cross-linked toner resin according to claim 1, wherein the cross-linked toner resin has a melt flow index of about 6 to about 40 g/10 min. and a Ge of about 20,000 to about 150,000 $dyn/cm^2$.

8. The cross-linked toner resin according to claim 1, wherein the cross-linked toner resin has a melt flow index of about 18 to about 20 g/10 min. and a Ge of about 65,000 to about 75,000 $dyn/cm^2$.

9. A cross-linked toner resin consisting essentially of linear portions and cross-linked portions, wherein the toner resin is an unsaturated polyester resin, wherein the cross-linked portions consist essentially of high density cross-linked microgel particles, wherein the cross-linked toner resin contains less than 0.20 percent by weight of acids, wherein the cross-linked toner resin has a cross-link density relative standard deviation of 3% or less, and wherein the cross-linked toner resin is prepared by:

(a) spraying a liquid chemical initiator onto the unsaturated polyester resin while blending prior to, during or subsequent to melting of the unsaturated polyester resin to form a polymer melt; and (b) subsequently cross-linking the polymer melt under high shear to form the cross-linked toner resin.

10. The cross-linked toner resin according to claim 9, wherein the unsaturated polyester resin is a poly (propoxylated bisphenol A fumarate).

11. The cross-linked toner resin according to claim 9, wherein the cross-linked toner resin contains less than 0.10 percent by weight of acids.

12. The cross-linked toner resin according to claim 9, wherein the cross-linked toner resin contains less than 0.05 percent by weight of acids.

13. The cross-linked toner resin according to claim 9, wherein the cross-linked toner resin contains no benzoic acid.

14. The cross-linked toner resin according to claim 9, wherein the cross-linked toner resin contain less than 0.10 percent by weight of residual chemical initiator and by-products of the chemical initiator.

15. A process of preparing a cross-linked toner resin, comprising the steps of:

(a) spraying a liquid chemical initiator onto or into an unsaturated polyester resin while blending prior to, during or subsequent to melting of the unsaturated polyester resin to form a polymer melt; and (b) subsequently cross-linking the polymer melt under high shear to form a cross-linked toner resin consisting essentially of linear portions and cross-linked portions, wherein the cross-linked portions consist essentially of high density cross-linked microgel particles, and wherein the cross-linked toner resin contains less than 0.20 percent by weight of acids.

16. The process according to claim 15, wherein the spraying is conducted by spraying the liquid chemical initiator onto granules of the unsaturated polyester resin in a mechanical blending apparatus.

17. The process according to claim 15, wherein the cross-linking of the polymer melt is conducted in an extruder.

18. The process according to claim 17, wherein the spraying is conducted by spraying the liquid chemical initiator onto granules of the unsaturated polyester resin in a flow-through mechanical blending apparatus in line with and immediately before the extruder.

19. The process according to claim 17, wherein the spraying comprises injection of the liquid chemical initiator into the unsaturated polyester resin in the extruder at or before the point before the unsaturated polyester resin has been melted and heated to a temperature where initiation of the cross-linking is desired.

20. The process according to claim 19, wherein the liquid chemical initiator is injected directly into the molten resin in the extruder.

21. The process according to claim 15, wherein the unsaturated polyester resin is a poly(alkoxylated bisphenol A fumarate).

22. The process according to claim 15, wherein the liquid chemical initiator is 1,1-bis(t-butyl peroxy)-3,3,5-trimethylcyclohexane.

23. The process according to claim 15, wherein the cross-linking occurs at a temperature of from about 150° C. to about 250° C.

24. The process according to claim 15, wherein the process further comprises removing substantially all by-products of the liquid chemical initiator from the cross-linked toner resin following the cross-linking.

25. The process according to claim 15, wherein the process further comprises forming solid toner particles from the cross-linked toner resin, and then optionally combining carrier particles with the solid toner particles to form a developer.

* * * * *